(12) United States Patent
Burhorst et al.

(10) Patent No.: US 10,105,763 B2
(45) Date of Patent: Oct. 23, 2018

(54) DRILLING MILLING TOOL AND METHODS FOR PRODUCING A THROUGH-HOLE

(71) Applicant: ZF Friedrichshafen AG, Friedrichshafen (DE)

(72) Inventors: Andre Burhorst, Visbek (DE); Guido Matz, Stemwede (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/435,789

(22) Filed: Feb. 17, 2017

(65) Prior Publication Data

US 2017/0239735 A1    Aug. 24, 2017

(30) Foreign Application Priority Data

Feb. 18, 2016 (DE) .................. 10 2016 202 528

(51) Int. Cl.
*B23C 5/10* (2006.01)
*B23B 51/02* (2006.01)
(Continued)

(52) U.S. Cl.
CPC .............. *B23B 51/02* (2013.01); *B23B 41/04* (2013.01); *B23B 51/048* (2013.01); *B23B 51/08* (2013.01);
(Continued)

(58) Field of Classification Search
CPC .............................. B23C 2220/52; B23C 3/02
(Continued)

(56) References Cited

U.S. PATENT DOCUMENTS 2,630,725 A * 3/1953 Black .................. B23B 29/03
407/48
3,018,675 A * 1/1962 Klages ................ B23B 29/03
407/101
(Continued)

FOREIGN PATENT DOCUMENTS

DE    78 33 000 U1    4/1980
DE    42 28 322 A1    3/1994
DE    196 09 820 A1   9/1996

OTHER PUBLICATIONS

German Search Report Corresponding to 10 2016 202 528.7 dated Nov. 21, 2016.

*Primary Examiner* — Daniel Howell
*Assistant Examiner* — Yasir Diab
(74) *Attorney, Agent, or Firm* — Davis & Bujold PLLC; Michael J. Bujold

(57) ABSTRACT

A drilling and milling tool (100) for a metallic workpiece, with a drilling and milling shank (120) having a plurality of circumferentially-cutting cutter tips (151, 152, 153, 154) and a plurality of front-end-cutting cutter tips (131, 132). At least one of the front-end-cutting cutter tips (132) is, at the same time, a circumferentially-cutting cutter tip whose radially outermost cutting point or cutting edge section projects, in the radial direction (R), beyond the circumferentially-cutting cutter tips (151 152, 153, 154). The circumferentially-cutting cutter tips (151, 152, 153, 154) are made with straight cutting edges and together these cutting edges produce a cylindrical cut contour. Two methods that can be carried out with the drilling and milling tool (100) for producing a through-going bore in a metallic workpiece.

13 Claims, 2 Drawing Sheets

(51) Int. Cl.
*B23C 5/16* (2006.01)
*B23B 41/04* (2006.01)
*B23B 51/04* (2006.01)
*B23B 51/08* (2006.01)
*B23B 51/10* (2006.01)
*B23C 3/02* (2006.01)

(52) U.S. Cl.
CPC ............ *B23B 51/108* (2013.01); *B23C 5/109* (2013.01); *B23C 5/16* (2013.01); *B23C 3/02* (2013.01); *B23C 2220/52* (2013.01)

(58) Field of Classification Search
USPC .......................................................... 407/31
See application file for complete search history.

(56) References Cited

U.S. PATENT DOCUMENTS

| | | | | |
|---|---|---|---|---|
| 4,093,392 A * | 6/1978 | Hopkins | ............... | B23C 5/2221 407/48 |
| 4,182,587 A * | 1/1980 | Striegl | .................... | B23C 5/109 407/113 |
| 4,265,574 A | 5/1981 | Eckle | | |
| 4,411,563 A * | 10/1983 | Moon | .................... | B23B 51/02 407/54 |
| 4,564,321 A | 1/1986 | Kondo et al. | | |
| 5,816,753 A * | 10/1998 | Hall | ....................... | B23B 51/009 408/223 |
| 5,911,548 A * | 6/1999 | Deiss | ........................ | B23C 3/34 407/12 |
| 5,931,616 A * | 8/1999 | Daub | ........................ | B23C 3/28 407/34 |
| 5,944,456 A * | 8/1999 | Shirley | .................... | B23C 5/109 407/42 |
| 5,944,462 A * | 8/1999 | Woodward | ............ | B23B 51/102 408/211 |
| 7,226,250 B2 * | 6/2007 | Gatton | .................... | B23B 51/08 408/1 R |
| 2002/0085887 A1* | 7/2002 | Schneider | ............. | B23B 51/048 407/30 |
| 2007/0020057 A1* | 1/2007 | Chen | ..................... | B23B 51/009 408/224 |
| 2008/0170921 A1* | 7/2008 | Sjoo | ........................ | B23B 29/24 408/232 |
| 2010/0209203 A1* | 8/2010 | Cao | ........................ | B23B 27/145 408/1 R |
| 2011/0091293 A1* | 4/2011 | Itoh | ........................... | B23C 3/30 407/40 |

* cited by examiner

DRILLING MILLING TOOL AND METHODS FOR PRODUCING A THROUGH-HOLE

This application claims priority from German patent application Ser. No. 10 2016 202 528.7 filed Feb. 18, 2016.

FIELD OF THE INVENTION

The invention concerns a drilling and miffing cutter (drilling and milling tool) for metallic workpieces, and two methods that can be carried out with the tool for producing a through-going bore in a metallic workpiece.

BACKGROUND OF THE INVENTION

From DE 196 09 820 A1 a drilling and milling cutter of the relevant type is already known.

SUMMARY OF THE INVENTION

The purpose of the present invention is to indicate a drilling and milling tool with which both a bore is produced and the inside surface of the bore can be machined.

This objective is achieved by a drilling and milling tool according to the invention, with the characteristics described below. With associated claims the invention also extends to two methods for forming or producing a bore (through-going bore) using a drilling and milling tool according to the invention. Preferred further developments and design features of the invention emerge analogously for all the objects of the invention from the description given below and the figures.

The drilling and milling tool according to the invention has a drilling and milling shank which comprises a plurality of circumferentially-cutting, cutting tips and a plurality of front-end-cutting tips, wherein at least one of the front-end-cutting tips is at the same time also a circumferential cutter whose radially outermost cutting point or cutting edge section projects in the radial direction beyond the cutter edges which (only) cut circumferentially. According to the invention, it is provided that the cutters which (only) cut circumferentially are made with straight cutting edges and these cutting edges, together, produce a cylindrical cut or milled contour.

In contrast to the drilling and milling cutter previously known from DE 196 09 820 A1, the circumferentially-cutting cutter tips on the drilling and miffing cutter according to the present invention are suitable for machining a bore of uniform cross-section with straight walls over the length of the bore, by circumferential milling (including rough-milling and finish-milling) of the inside surface of the bore, as explained in greater detail below.

Preferably, the circumferentially-cutting cutter tips are arranged stepwise and overlapping in the axial direction along spiral or helical flutes or chip chambers, which start at or lead away from the cutters at the end. In particular, the drilling and milling shank has two cutters at the end, from which two helical chip flutes lead away, along which flutes the circumferential cutters are arranged.

The cutting edges of the circumferentially-cutting cutter tips can be designed for rough milling or finish milling, in order to be able to produce a defined surface on the inside of the bore. For that purpose the cutting edges of the cutters have a roughened or ground profile.

The drilling and milling tool according to the invention can also have at least one flat cutting edge for face-milling the edge of the bore (at the inlet of the bore) and/or for flat countersinking. Thus, the tool according to the invention is also suitable for producing a flat surface and/or a recessed flat surface, The drilling and milling tool according to the invention can also have internal coolant ducts and coolant outlet openings in the drilling and milling shank.

The first method according to the invention for producing a through-going bore in a metallic workpiece using a drilling and milling tool according to the invention comprises the following steps, which are carried out in one working operation:

Drilling through the workpiece by a forward-feed movement of the drilling and milling tool (or conversely, by moving the workpiece in the opposite direction);

Stopping the forward-feed movement as soon as the circumferentially-cutting cutter tips on the shank of the drilling and milling tool are inside the previously produced bore (through-bore), or in a defined axial relative position; and Orbital machining of the inside surface of the bore, during which in addition to its rotation, the drilling and milling tool follows a circumferential orbit.

The second method according to the invention for producing a through-going bore in a metallic workpiece using a drilling and milling tool according to the invention comprises the following steps, which are carried out in one working operation:

Drilling through the workpiece by a forward-feed movement of the drilling and milling tool;

Face-milling or flat countersinking of the edge of the bore (at the inlet of the bore) at the end of the forward-feed movement;

Withdrawing the drilling and milling tool or moving it back, this backward movement being stopped as soon as the circumferentially cutting cutters on the shank of the drilling and milling tool are inside the previously produced bore (through-bore) or are in a defined axial position; and Orbital machining of the inside surface of the bore.

In both methods according to the invention, the drilling through can be full drilling or counterboring. Furthermore, the orbital machining can be carried out along an orbit that deviates from the circular (non-circular orbit), in order thereby to be able to produce non-circular bore contours in a specific manner. Moreover, for example oval or triangular non-circularities can be compensated by a non-circular milling tool orbital movement. For example, the orbit or orbital movement of the milling tool can be an epitrochoid.

In summary the invention, including its further developments and design features, offers the following advantages:

Drilling and subsequent rough-milling or finish-milling of the inside surface of the bore can be carried out in a single working operation. Finish-boring, previously carried out in a separate working step, can be replaced by the orbital machining.

Short axial length of the drilling and milling tool; for example, the drilling and miffing shank has an axial length which corresponds to approximately twice the thickness of the workpiece to be drilled through. The short drilling and milling tool is also very strong, with high bend rigidity and low vibration, Very good achievement of required bore circularities and/or surface roughness values of the inside surface of the bore. Defined roughness profiles can be produced by correspondingly designed cutting edges on the circumferentially-cutting cutter tips.

Short cycle or machining times. Furthermore, during the orbital machining very high cutting or milling speeds are also possible.

By suitably designing the orbital machining, typical non-circular profiles resulting for example from machining forces and/or workpiece stresses can be compensated.

The orbital machining enables a defined orbit o be set and varied.

BRIEF DESCRIPTION OF THE DRAWINGS

Below, the invention will be explained in greater detail, as a non-limiting example, with reference to an example embodiment related to the drawing. Features illustrated in the drawing and/or explained in what follows can also be general features of the invention and further developments of the invention, even independently of illustrated and/or described combinations of features. The drawing shows.

DETAILED DESCRIPTION OF THE PREFERRED EMBODIMENTS

Figure 1:
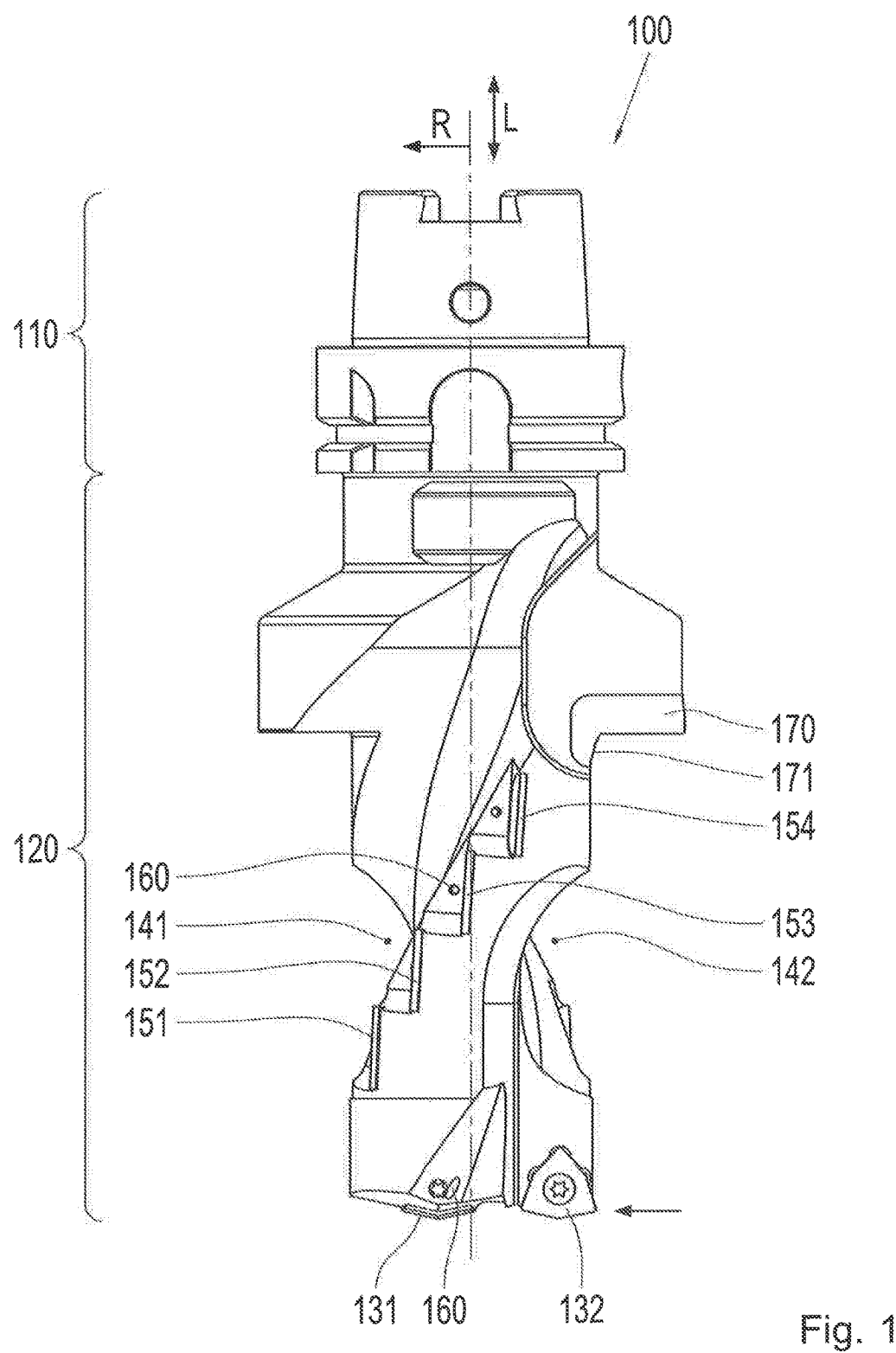
FIG. 1: A drilling and milling tool, viewed from the side.

The drilling and milling tool 100 shown in FIG. 1 comprises a drilling and milling shank (main body) 120 and a tool holder interface 110. At the front end of the shank 120 are two replaceable cutting tips 131 and 132 whose cuts overlap in the radial direction R. In the shank 120, leading away from the cutters 131 and 132 at the front end there are two helical or spiral chip flutes (chip chambers) 141 and 142. Along these chip flutes 141 and 142 are in each case arranged a plurality (for example four) circumferentially-cutting cutter tips 151, 152, 153 and 154 that overlap in the axial direction L and have straight cutting edges, which are fixed by screwing, brazing or bonding to the webs alongside the flutes 141 and 142 to form cascading or stepped pockets. These circumferentially-cutting cutter tips are for example PCD (polycrystalline diamond) cutters.

In the view shown, only the four cutter tips 151, 152, 153 and 154 that' are arranged along the visible chip flute 141 can be seen. In the other, out-of-sight chip flute 142 there are also arranged four cutter tips, which in particular have the same orbits or trajectories so that in each case two cutters opposite one another form a cutter pair. Each cutter tip can be cooled by a coolant emerging by way of internal coolant ducts through a coolant outlet 160, such that the coolant outlets 160 for the circumferentially-cutting cutter tips 151 to 154 are located directly in the stepped pockets.

The drilling and milling tool 100 also comprises a flat cutter tip 170 with a transition chamfer 171 on the inside, which serves for face-milling. Preferably, all the cutter tips 131, 132, 151, 152, 153, 154, and 170 are replaceable. The cutter tips 131, 132, 151, 152, 153, 154, and 170 can also be made from different materials.

The radially outermost cutter tip 132 on the end of the shank 120 at the same time also cuts circumferentially, since its radially outermost cutting point (see arrow) projects in the radial direction R beyond the cutter tips 151 to 154 arranged around the circumference of the shank, so that the orbit or trajectory of the cutting point has a larger diameter than the orbits or trajectories of the cutting edges of the cutter tips 151 to 154 which only cut circumferentially. Furthermore it is provided that the cutting edges of the only circumferentially-cutting cutter tips 151 to 154, combined together, produce a cylindrical cut or milled contour so that their orbit or trajectory with its smaller diameter forms or describes a uniform, i.e. coherent cylindrical shell surface.

The drilling and milling tool 100 enables a through-going bore to be produced in a workpiece, for example with a diameter of around 50 mm, and in the same working step enables the inside surface of the bore just produced to be machined. This is explained in more detail below with reference to FIGS. 2A-2C, wherein the procedure described serves, for example, for the production of a bearing seat to hold an outer bearing race of a roller bearing.

Figure 2A:
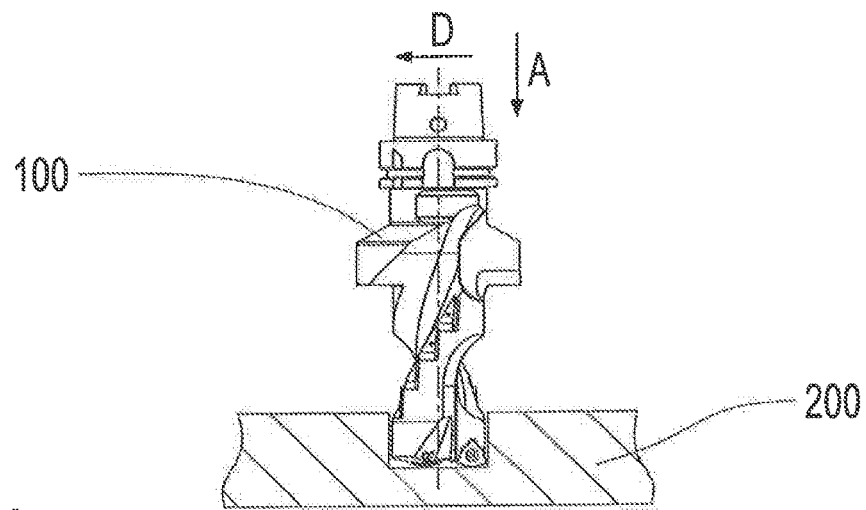
FIGS. 2A-2C: Show a sequence according to the invention for producing a through-going bore with the drilling and milling tool illustrated in FIG. 1.
Figure 2B:
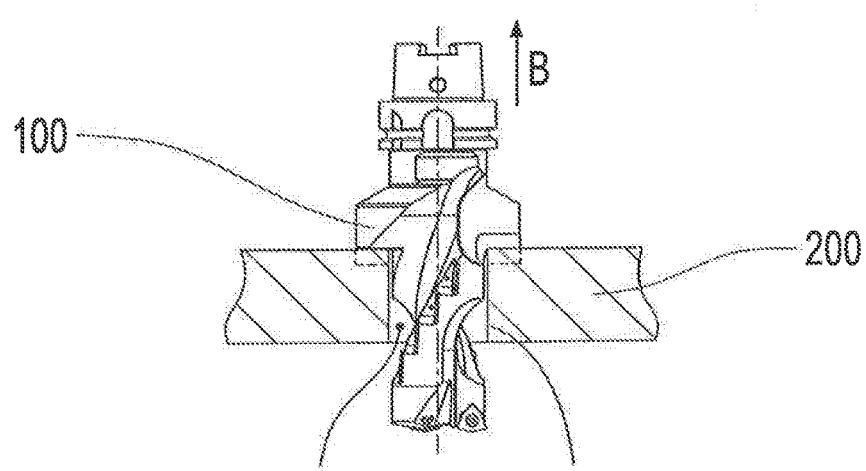
Figure 2C:
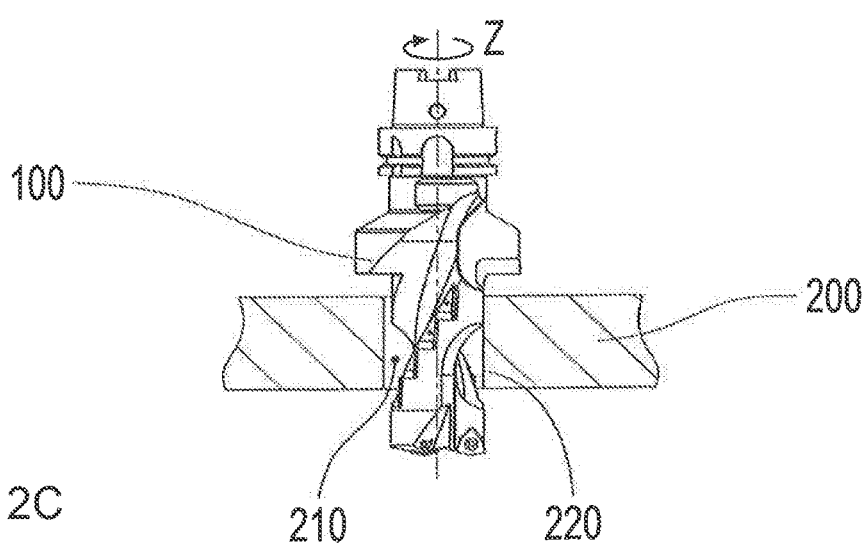

The metallic workpiece 200 is drilled through by rotating and forward-feeding D/A the drilling and milling tool 100 (and/or the workpiece 200 to be drilled through), during which the two front-end cutter tips 131 and 132 are in cutting engagement, whereas the cutter tips 151 to 154 at the circumference of the shank 120, rotating with an orbit or trajectory of smaller diameter, do not come into cutting engagement with the inside surface 220 of the bore. At the end of the actual forward-feed movement A, the edge of the bore is face-milled or even flat-countersunk by means of the flat cutter tip 170, so that by virtue of the chamfer 171 on the flat cutter tip 170 a corresponding chamfer (inlet chamfer, front bevel) is produced at the edge or inlet of the bore. Thus, during the face milling or flat countersinking, chamfering takes place. That sequence is illustrated in FIGS. 2A and 2B, with the optional flat countersinking indicated only by a broken line in FIG. 2B.

The return movement B of the drilling and milling tool 100 is stopped as soon as the circumferentially-cutting cutter tips 151 to 154 are inside the bore 210 just produced. By orbital machining (orbital milling) Z the inside surface of the bore, or bore wall 220, is now machined, this stage being a milling, rough-milling or finish-machining operation. The cutting edges of the cutter tips 151 to 154 are designed appropriately. In that way the entire inside surface 220 of the bore is machined at the same time. The orbital machining is carried out without any axial relative movement between the drilling and milling tool 100 and the workpiece 200, although in principle there may be an axial relative movement.

During the orbital machining Z, without loss of time and with the help of at least one additional and correspondingly designed cutter tip on the shank 120 a back-end chamfer at the outlet of the bore can be produced. This simultaneous conjoint production of a back-end chamfer can be called reverse orbiting. Thus, if appropriately designed the drilling and miffing tool according to the invention also enables reverse orbiting for the production of a back-end chamfer at the outlet of the bore 210 previously produced in the workpiece 200. Analogously, during the orbital machining an inlet chamfer can be produced at the bore inlet if this has not already been produced by the face-miffing or flat countersinking.

After the end of the orbital machining Z, the drilling and milling tool 100 or its shank 120 is positioned concentrically in the bore 120 produced, and withdrawn without contact.

Another procedure without face milling and/or flat countersinking at the inlet side of the bore is explained above.

With a suitable design of the drilling and milling tool 100, in principle bore contours which are slightly concave or slightly convex in the axial direction L can also be produced. This is achieved in particular by appropriate design and arrangement of the cutter tips 151 to 154 that only cut circumferentially, to produce a correspondingly convex-cylindrical (barrel-shaped) or concave-cylindrical cut or milled contour. The production of non-circular bore contours is described above.

The chip flutes 141 and 142 are formed along substantially the full axial length of the drilling and milling shank 120. Thanks to these, both during drilling and during the subsequent milling effective clearing of the chips from the front-end and circumferentially-cutting cutter tips 131, 132, 151, 152, 153 and 154 can be ensured. Owing to the staggered arrangement of the circumferentially-cutting cutter tips 151 to 154 along the chip flutes 141 and 142, the flutes are not, or only slightly clogged or damaged by the chips produced (no direct impact) and also are not subject to any premature wear, so that the tool has a long life.

INDEXES

100 Drilling and milling tool
110 Tool holder interface
120 Drilling and milling shank
131 Cutter tip
132 Cutter tip
141 Chip flute
142 Chip flute
151 Cutter tip
152 Cutter tip
153 Cutter tip
154 Cutter tip
160 Coolant outlet opening
170 Flat cutter tip
171 Chamfer
200 Workpiece
210 Bore
A Forward-feed movement
B Return movement
D Rotation movement
L Axial direction
R Radial direction
Z Orbital machining

The invention claimed is:

1. A combination drilling and milling tool for a metallic workpiece, the combination drilling and milling tool comprising:
a drilling and milling shank having:
at least two front-end cutter tips at a leading end of the shank such that at least one of the front-end cutter tips of the at least two front-end cutter tips at the end is, at a same time, a circumferentially-cutting cutter tip having a radially outermost cutting point or cutting edge section projecting, in a radial direction, beyond a plurality of circumferentially-cutting cutter tips,
the circumferentially-cutting cutter tips being made with straight cutting edges, and being arranged on at least two helical chip flutes such that each of the plurality of circumferentially-cutting cutter tips have the same orbit as an opposing circumferentially-cutting cutter tip on an opposing helical chip flute so that in each case two circumferentially-cutting cutter tips form a cutter pair and together the straight cutting edges produce a cylindrical cut contour.

2. The drilling and milling tool according to claim 1, wherein the circumferentially-cutting cutter tips are arranged stepwise and overlapping in an axial direction along the at least two helical chip flutes extending away from the front-end cutter tips.

3. The drilling and milling tool according to claim 2, wherein the drilling and milling shank has two front-end cutter tips, from which two helical chip flutes extend away, along which the circumferentially-cutting cutter tips are arranged.

4. The drilling and milling tool according to claim 1, wherein the cutting edges of the circumferentially-cutting cutter tips are designed for either rough-milling or finish-milling.

5. The drilling and milling tool according to claim 4, wherein the cutting edges of the circumferentially-cutting cutter tips have a defined roughness by virtue of either a roughened profile or a ground profile.

6. The drilling and milling tool according to claim 1, wherein the drilling and milling tool comprises at least one face-milling cutter.

7. The drilling and milling tool according to claim 1, wherein the drilling and milling tool has internal coolant ducts.

8. A method for producing a through-going bore in a metallic workpiece using a combination drilling and milling tool having a drilling and milling shank which has at least two front-end cutter tips, at a leading end of the shank, such that at least one of the front-end cutter tips at the end is, at a same time, a circumferentially-cutting cutter tip having a radially outermost cutting point or cutting edge section that projects beyond a plurality of circumferentially-cutting cutter tips in a radial direction,
the circumferentially-cutting cutter tips are made with straight cutting edges, and, together the straight cutting edges, produce a cylindrical cut contour,
the circumferentially-cutting cutter tips being arranged on at least two helical chip flutes such that the circumferentially-cutting cutter tips on each helical chip flute has the same orbit as an opposed circumferentially-cutting cutter tip so that in each case two opposed circumferentially-cutting cutter tips on opposed helical chip flutes form a cutter pair, the method comprising the following which are carried out in one working operation:
drilling through the workpiece by a forward-feed movement of the drilling and milling tool with the at least two front-end cutter tips;
stopping the forward-feed movement of the drilling and milling tool as soon as the circumferentially-cutting cutter tips, on the drilling and milling tool, are located inside the bore just produced; and
orbital milling of an inside surface of the bore with the plurality of circumferentially-cutting cutter tips.

9. A method of producing a through-going bore in a metallic workpiece using a combination drilling and milling tool having a drilling and milling shank which at least two front-end cutter tips, at a leading end of the shank, such that at least one of the front-end cutter tips at the end is, at a same time, a circumferentially-cutting cutter tip having a radially outermost cutting point or cutting edge section that projects beyond a plurality of circumferentially-cutting cutter tips in a radial direction,
the circumferentially-cutting cutter tips are made with straight cutting edges, and, together the straight cutting edges, produce a cylindrical cut contour,
the method comprising the following carried out during one working operation:
drilling through the workpiece by forward-feed movement of the drilling and milling tool with the at least two front-end cutter tips;
either face-milling or flat countersinking an edge of the bore at an end of the forward-feed movement with a flat cutter tip;

withdrawing the drilling and milling tool and stopping the withdrawing movement as soon as the circumferentially-cutting cutter tips are located inside the bore just produced; and orbital milling of the inside surface of the bore with the plurality of circumferentially-cutting cutter tips.

10. The method according to claim 8, wherein the orbital milling is carried out with a non-circular trajectory.

11. The method according to claim 8, wherein the drilling through is full drilling or counterboring.

12. The method according to claim 9, wherein the orbital milling is carried out with a non-circular trajectory.

13. The method according to claim 9, wherein the drilling through is full drilling or counterboring.

* * * * *